(12) United States Patent
Morenko (10) Patent No.: US 11,384,659 B2
(45) Date of Patent: Jul. 12, 2022

(54) BOSS FOR GAS TURBINE ENGINE

(71) Applicant: PRATT & WHITNEY CANADA CORP., Longueuil (CA)

(72) Inventor: Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1 day.

(21) Appl. No.: 17/018,409

(22) Filed: Sep. 11, 2020

(65) Prior Publication Data
US 2022/0082030 A1    Mar. 17, 2022

(51) Int. Cl.
| *F01D 25/16* | (2006.01) |
| *F01D 25/18* | (2006.01) |
| *F01D 25/28* | (2006.01) |
| *F01D 25/24* | (2006.01) |

(52) U.S. Cl.
CPC ......... *F01D 25/183* (2013.01); *F01D 25/24* (2013.01); *F01D 25/28* (2013.01); *F05D 2230/60* (2013.01)

(58) Field of Classification Search
CPC ........ F01D 25/16; F01D 25/162; F01D 25/18; F01D 25/183; F01D 9/065; F05D 2260/98; F02C 7/06
See application file for complete search history.

(56) References Cited

U.S. PATENT DOCUMENTS

| 6,102,577 | A * | 8/2000 | Tremaine | ............... | F01D 25/186 384/493 |
| 7,278,516 | B2 * | 10/2007 | Zalewski | ................ | F01D 9/065 184/6.11 |
| 7,721,546 | B2 | 5/2010 | Fish et al. | | |
| 8,641,101 | B2 | 2/2014 | Guclucan | | |
| 10,294,865 | B2 | 5/2019 | Morenko | | |
| 2005/0199445 | A1 | 9/2005 | Zalewski | | |
| 2012/0011824 | A1 * | 1/2012 | Cigal | ..................... | F01D 25/16 60/39.08 |
| 2013/0224012 | A1 | 8/2013 | Durocher | | |
| 2018/0224043 | A1 * | 8/2018 | Hendrickson | ........... | F16L 33/00 |

FOREIGN PATENT DOCUMENTS

| EP | 0342087 A1 | 11/1989 |
| WO | 20130162982 A1 | 10/2013 |

OTHER PUBLICATIONS

European Search Report issued in counterpart application 21196404.4 dated Feb. 7, 2022.

* cited by examiner

*Primary Examiner* — David E Sosnowski
*Assistant Examiner* — Maxime M Adjagbe
(74) *Attorney, Agent, or Firm* — Norton Rose Fulbright Canada LLP (57) ABSTRACT

A gas turbine engine, has: a case extending circumferentially around a central axis of the gas turbine engine; a boss protruding from the case away from the central axis, the boss defining an internal passage; a tubular member received within the internal passage of the boss and secured to the boss; an annular gap extending all around the tubular member and located between the tubular member and the boss; and a fitting hydraulically connecting a fluid source to the tubular member, the fitting having a portion received within the tubular member and encircled by both of the annular gap and the tubular member, the fitting sealingly engaged to the tubular member.

20 Claims, 5 Drawing Sheets

BOSS FOR GAS TURBINE ENGINE

TECHNICAL FIELD

The application relates generally to gas turbine engines and, more particularly, to engine cases with bosses used to hydraulically connect fluid lines, such as lubricant lines.

BACKGROUND OF THE ART

Gas turbine engine cases are typically provided on their outer sides with bosses or similar service or mounting pads. The bosses are generally machined directly on the case or separately produced as single cast parts which are then welded to the case. A boss may be used as an interface to hydraulically connect a fluid line, such as a lubricant line. A sealing member, such as an O-ring, is used to provide a sealing engagement between the lubricant line and the boss. However, some cases of the engines, for instance gas generator cases and turbine exhaust cases, may become hot during use. The cases have a maximum operating temperature that is greater than that of the sealing member.

SUMMARY

In one aspect, there is provided a gas turbine engine, comprising: a case extending circumferentially around a central axis of the gas turbine engine; a boss protruding from the case away from the central axis, the boss defining an internal passage; a tubular member received within the internal passage of the boss and secured to the boss; an annular gap extending all around the tubular member and located between the tubular member and the boss; and a fitting hydraulically connecting a fluid source to the tubular member, the fitting having a portion received within the tubular member and encircled by both of the annular gap and the tubular member, the fitting sealingly engaged to the tubular member.

In some embodiments, the fitting is sealingly engaged to the tubular member via a sealing member, the sealing member being encircled by the tubular member and by the annular gap, the annular gap containing an insulating material having a thermal conductivity less than that of the tubular member.

In some embodiments, the tubular member is secured to the boss via a braze joint between the tubular member and the boss.

In some embodiments, the sealing member and the case are disposed on respective opposite sides of the braze joint.

In some embodiments, the internal passage has a first section and a second section, a cross-sectional area of the second section greater than that of the first section and greater than a diameter of the tubular member to define the annular gap.

In some embodiments, the tubular member defines a conduit sealed from the internal passage of the boss with three seals serially disposed between the conduit of the tubular member and the internal passage.

In some embodiments, the three seals include a sealing member providing a sealing engagement between the fitting and the tubular member, a sealing contact between an end of the tubular member and an annular flange of the fitting, the annular flange secured to a flange of the boss, and a braze joint within the internal passage and between the tubular member and the boss, the braze joint extending all around the tubular member.

In some embodiments, the annular gap extends between the sealing contact and the braze joint, the sealing member located radially between the braze joint and the sealing contact relative to the central axis.

In some embodiments, a second sealing member is between the boss and the annular flange of the fitting, the second sealing member creating a sealing engagement between the boss and the annular flange of the fitting.

In some embodiments, the second sealing member is a C-ring seal surrounding the end of the tubular member.

In another aspect, there is provided a boss assembly for a case of a gas turbine engine, comprising: a boss having a body securable to the case and extending along a boss axis from a first end securable to the case to a second end, the body defining an internal passage between the first end and the second end; a tubular member received within the internal passage of the body and secured to the body, the tubular member having an inner surface defining a conduit for flowing a fluid; a portion of the internal passage having a diameter greater than a portion of the tubular member received within the internal passage to define an annular gap between the tubular member and the body, the annular gap extending all around the boss axis; and a fitting hydraulically connectable to a fluid line, the fitting received within the portion of the tubular member, the fitting sealingly engaged to the inner surface of the tubular member.

In some embodiments, the fitting is sealingly engaged to the tubular member via a sealing member, the sealing member disposed radially inwardly of the annular gap relative to the boss axis between the portion of tubular member and the fitting, the sealing member axially aligned with the annular gap relative to the boss axis, the annular gap containing an insulating material having a thermal conductivity less than that of the tubular member.

In some embodiments, the tubular member is secured to the boss via a braze joint between the tubular member and the boss and between the first end and the second end of the boss.

In some embodiments, the sealing member and the first end of the boss are disposed on respective opposite sides of the braze joint.

In some embodiments, the conduit of the tubular member is sealed from the internal passage of the boss with the sealing member between the fitting and the tubular member, a sealing contact between an end of the tubular member and an annular flange of the fitting, the annular flange secured to the boss, and the braze joint within the internal passage and between the tubular member and the boss, the braze joint extending all around the tubular member.

In some embodiments, the annular gap extends axially relative to the boss axis between the sealing contact and the braze joint, the sealing member located axially between the braze joint and the sealing contact relative to the boss axis.

In some embodiments, a second sealing member is between the boss and the annular flange of the fitting, the second sealing member creating a sealing engagement between the boss and the annular flange of the fitting.

In some embodiments, the second sealing member is a C-ring seal surrounding the end of the tubular member.

In yet another aspect, there is provided a boss assembly for a case of a gas turbine engine, comprising: a boss having a body and extending along a boss axis from a first end securable to the case to a second end, the body defining an internal passage between the first end and the second end; a tubular member received within the internal passage of the body and secured to the body, the tubular member having an inner surface defining a conduit for flowing a fluid, the inner surface defining a seat to be sealingly engaged by a sealing member of a fitting; and an annular gap extending all around the tubular member and located radially between the tubular member and the boss relative to the boss axis, the seat spaced apart from the body of the boss in a radial direction relative to the boss axis by the tubular member and by the annular gap, the annular gap containing an insulating material having a thermal conductivity less than that of the tubular member.

In some embodiments, the insulating material is air.

DESCRIPTION OF THE DRAWINGS

Reference is now made to the accompanying figures in which.

DETAILED DESCRIPTION

In at least some of the figures that follow, some elements appear more than once (e.g. there may be two, three, etc. of a given part in a given embodiment). Accordingly, only a first instance of each given element may be labeled, to maintain clarity of the figures.

Figure 1:
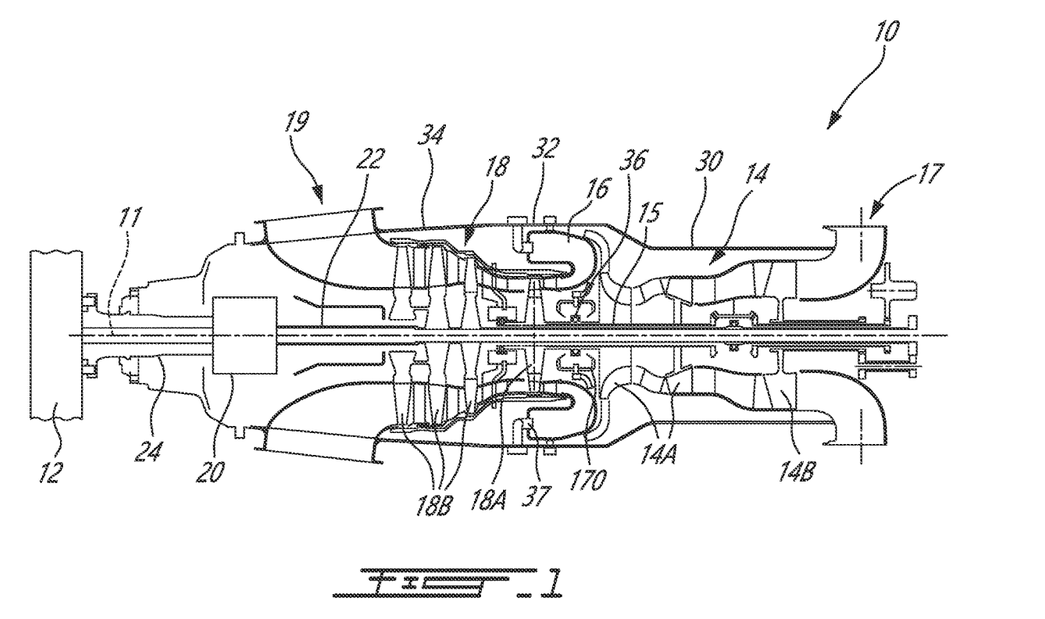
FIG. 1 is a schematic cross sectional view of a gas turbine engine.

FIG. 1 illustrates a gas turbine engine 10 of a type preferably provided for use in subsonic flight for driving a load 12, such as, but not limited to, a propeller or a helicopter rotor. Depending on the intended use, the engine 10 may be any suitable aircraft engine. In the present embodiment, the engine 10 is a gas turbine engine, and more particularly a turboprop, and generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The exemplary embodiment shown in FIG. 1 is a "reverse-flow" engine because gases flow from an inlet 17, at a rear portion of the engine 10, to an exhaust outlet 19, at a front portion of the engine 10. This is in contrast to "through-flow" gas turbine engines in which gases flow through the core of the engine 10 from a front portion to a rear portion. The engine 10 may be a reverse-flow engine (as illustrated) or a through-flow engine.

In the illustrated embodiment, the turbine section 18 has a high-pressure turbine 18A in driving engagement with a high-pressure compressor 14A. The high-pressure turbine 18A and the high-pressure compressor 14A are mounted on a high-pressure shaft 15. The turbine 18 has a low-pressure turbine, also known as power turbine 18B drivingly engaged to the load 12. The power turbine 18B is drivingly engaged to a low-pressure compressor 14B via a low-pressure shaft 22. A gearbox 20, which may be a planetary gearbox, is configured as a reduction gearbox and operatively connects the low-pressure shaft 22 that is driven by the power turbine 18B to a shaft 24 that is in driving engagement with the load 12, while providing a reduction speed ratio therebetween. In the present embodiment, the load 12 is a rotor of an aircraft, and more particularly a propeller 12, and thus the shaft 24 driving the aircraft rotor 12 is referred to as a rotor shaft.

The engine 10 typically comprises a segmented case assembly. For instance, the engine may comprise a compressor case 30, a gas generator case 32, and a turbine case 34 axially interconnected about a central axis 11 of the engine 10.

Figure 2:
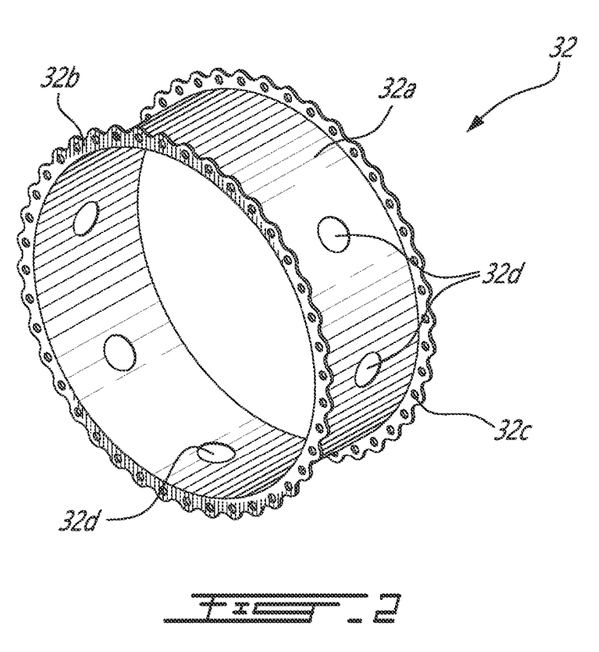
FIG. 2 is a three dimensional view of a case, such as a gas generator case, of the gas turbine engine of FIG. 1.

Referring now to FIG. 2, the gas generator case 32 is shown schematically and includes an annular or cylindrical shell 32a extending axially between a front mounting flange 32b and a rear mounting flange 32c. In the embodiment shown, the gas generator case 32 surrounds a hot section of the engine 10. Hence, the shell 32a and the flanges 32b, 32c may be made of nickel alloys or other materials having suitable thermal resistance properties. In cold sections of the engine (e.g. compressor section 14), the shell 32a could be made of other materials, such as aluminium. Depending on the applications, the shell 32a may be made from sheet metal in order to minimize the weight of the engine 10. One or more sheet metal parts may be rolled and welded to create a cylinder. The front and rear flanges 32b and 32c may then be welded to the opposed ends of the cylinder to complete the assembly of the shell 32a.

The shell 32a defines apertures 32d for receiving bosses. The bosses project outwardly from the shell 32a relative to the central axis 11. The bosses may be used for various applications, including air/oil line connections, mounting equipment such as thermocouples and sensors, and providing access for boroscopes for inspection. This is not intended to constitute an exhaustive list of all possible applications.

Figure 3:
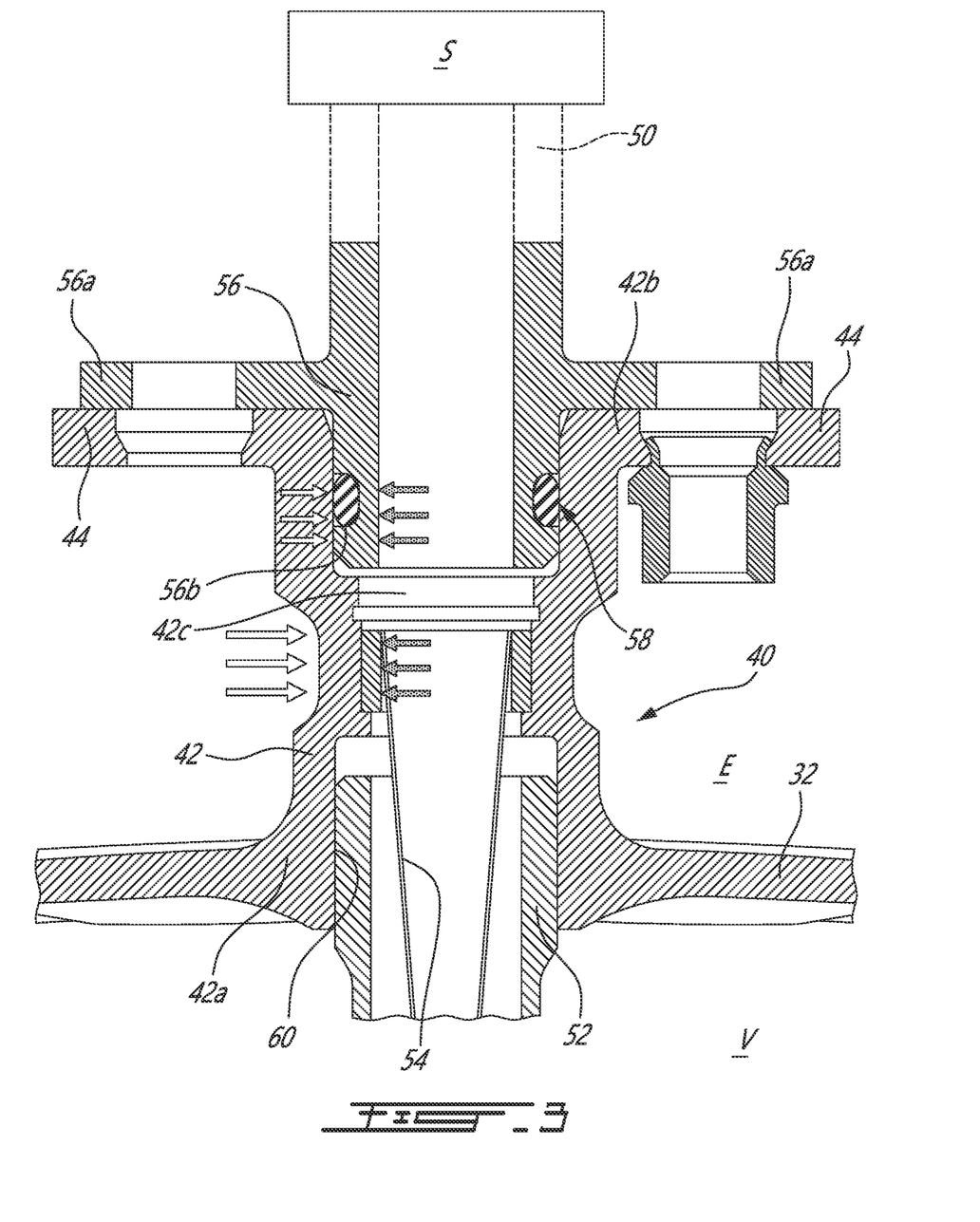
FIG. 3 is a cutaway view of a boss in accordance with one embodiment for the case of FIG. 2.

Referring to FIG. 3, a boss in accordance with one embodiment is shown at 40. The boss 40 includes a body 42 extending from a first end 42a secured to the gas generator case 32 to a second end 42b. The boss 40 further includes an annular flange 44 proximate the second end 42b, and which is secured to the second end 142b in the embodiment shown, that is used for securing a component to the boss 40. The boss 40 defines an internal passage 42c located within the body 42 and extending from the first end 42a to the second end 42b.

Figure 6:
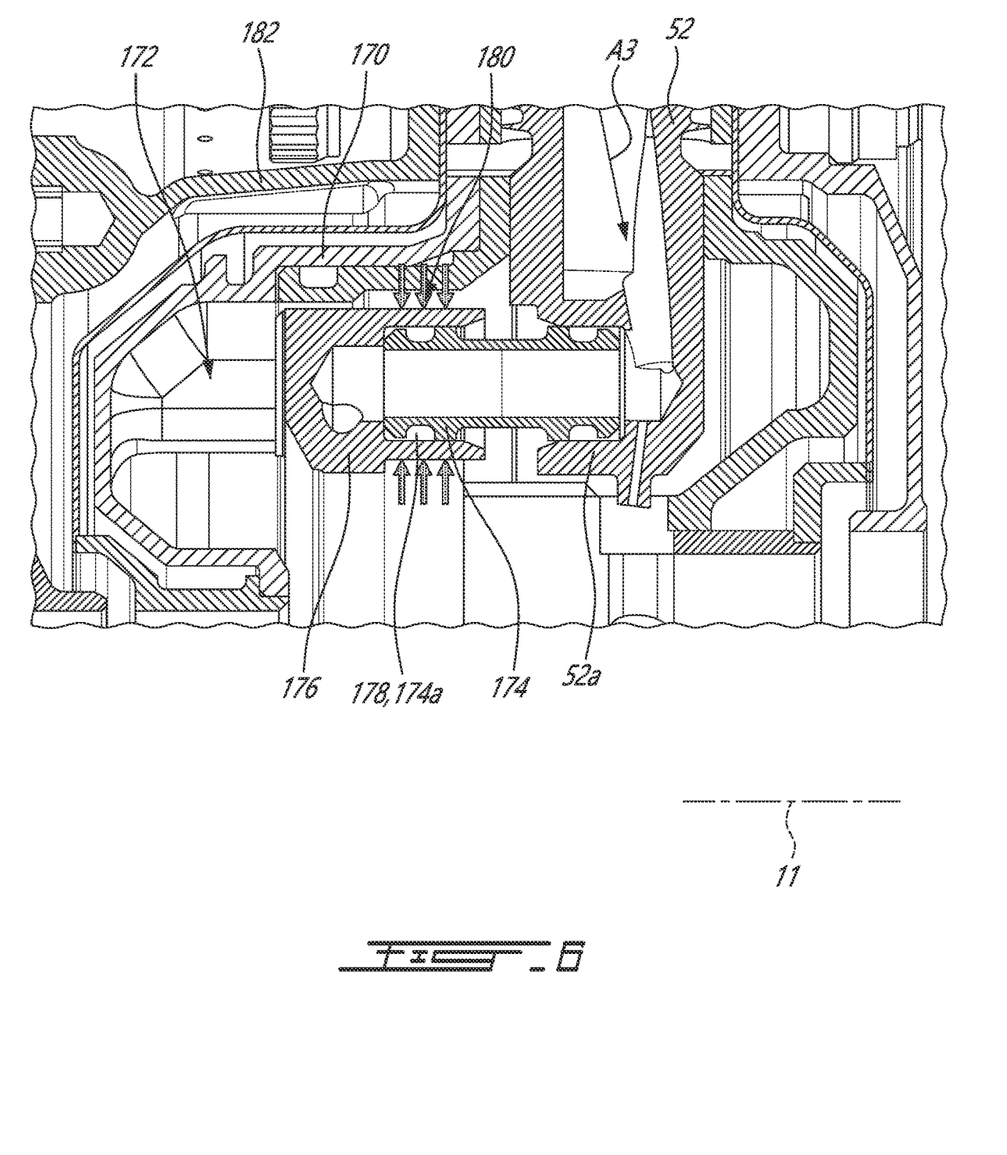
FIG. 6 is a cutaway view of a bearing housing of the gas turbine engine of FIG. 1.

In the embodiment shown, the boss 40 is used for securing a fluid line 50, which is hydraulically connected to a fluid source S, to a tube 52 that is hydraulically connected to a component of the engine 10 that needs fluid from the fluid source S. The fluid source S may be, for instance, a source of lubricant, fuel, or compressed air. The component in need of the fluid may be, for instance, a bearing 36 (FIG. 1) that rotatably support one of the shafts 15, 22 of the engine 10 and that needs lubricant for proper operation. Alternatively, the component may be a fuel injector 37 used to inject fuel to the combustor 16 of the engine 10. The component may be a bearing housing 170 (FIG. 6) that uses compressed air for limiting lubricant from flowing out of a bearing cavity 172 (FIG. 6). In the embodiment shown, the fluid source S is a source of lubricant, such as a lubricant reservoir. Lubricant is flown to the bearing 36 via the fluid line 50, the boss 40, and the tube 52. A fuel filter 54, which has a conical shape in the embodiment shown, is disposed within the internal passage 42c of the boss 40 and within the tube 52 for removing unwanted particles from the lubricant flowing toward the bearing 36 (FIG. 1).

As illustrated in FIG. 3, the fluid line is connected to the boss 40 via a fitting, also referred to as an adaptor, 56 that is sealingly engaged to the boss 40. The fitting 56 creates an interface between the fluid line 50 and the boss 40. The fitting 56 has an annular flange 56a secured to the annular flange 44 of the boss 40 via any suitable fasteners.

A sealing member 58, such as an O-ring, creates a sealing engagement between the fitting 56 and the boss 40. More specifically, the sealing member 58 is herein made of an elastomeric material and creates the sealing engagement by being biased against both of the fitting 56 and the body 42 of the boss 40. In the illustrated embodiment, the sealing member 58 is received within an annular groove 56b defined by the fitting 56. Other configurations are contemplated.

The gas generator case 32 is a pressurized vessel because air that has been compressed by the compressor section 16 of the engine 10 is injected into a volume V that contains the combustor 16 of the engine 10 and defined by the gas generator case 32. In use, the fuel is mixed with the compressed air and ignited to generate combustion gases that are flown through the turbine section 18 (FIG. 1). Therefore, temperatures inside the volume V are high. The combustion process increases a temperature of the gas generator case 32. The heat transferred to the gas generator case 32 from the combustion gases is diffused within the body 42 of the boss 40 by conduction.

In normal operating conditions, that is, when the engine 10 is flying in cruise, the boss 40 is cooled by the lubricant that flows within the internal passage 42c of the body 42 of the boss 40. However, in some operating conditions, such as transient conditions (e.g., engine shut down, engine warm-up), the flow of lubricant flowing within the internal passage 42c may be reduced compared to the flow during the normal operating conditions. In those conditions, less heat may be extracted from the body 42 of the boss 40 by the lubricant. This may cause the body 42 of the boss 40 to reach a temperature that may be close to a temperature limit of the sealing member 58.

To alleviate this, the sealing member 58 is disposed as far away as possible from the gas generator case 32 thereby increasing a thermal resistance between the case 32 and a location on the boss 40 that registers with the sealing member 58. Stated differently, the sealing member 58 is located proximate the second end 42b of the body 42 of the boss 40 whereas the first end 42b of the body 42 of the boss 40 is secured to the case 32.

This may require having a limit on a minimal length of the boss 40. If the boss 40 were too short (insufficient distance between the ends 142a, 142b of the body 142 of the boss), the sealing member 58 would be too close to the gas generator case 32, which may cause the aforementioned problems. This minimal length requirement of the boss 40 may impede efforts made to design the engine 10 as streamlined as possible. In other words, the engine 10 is surrounded by a cowling (not shown). The smaller is a cross-sectional area of the cowling taken on a plane normal to the central axis 11, the less drag the engine 10 may generate. Decreasing the length of the boss 40 may contribute in allowing designer to decrease the cross-sectional area of the cowling. However, a shortening of the boss is limited by the temperature limit of the sealing member.

Moreover, the tube 52 is secured to the inside of the body 42 of the boss 40 via a weld or braze joint 60. The weld joint 60 seals the interior of the tube 52 from the volume V. If the weld joint 60 were to be damaged, lubricant flowing within the tube 52 may reach the volume V and might be burned in the combustor 16. This may be undesired because the burned lubricant may pollute the atmosphere. Moreover, the lubricant may flow out of the internal passage 42c of the body 42 of the boss 40 to an environment E outside the volume V defined by the gas generator case 32 via the connection between the fitting 56 and the boss 40 if the sealing member 58 were to become damaged.

Figure 4:
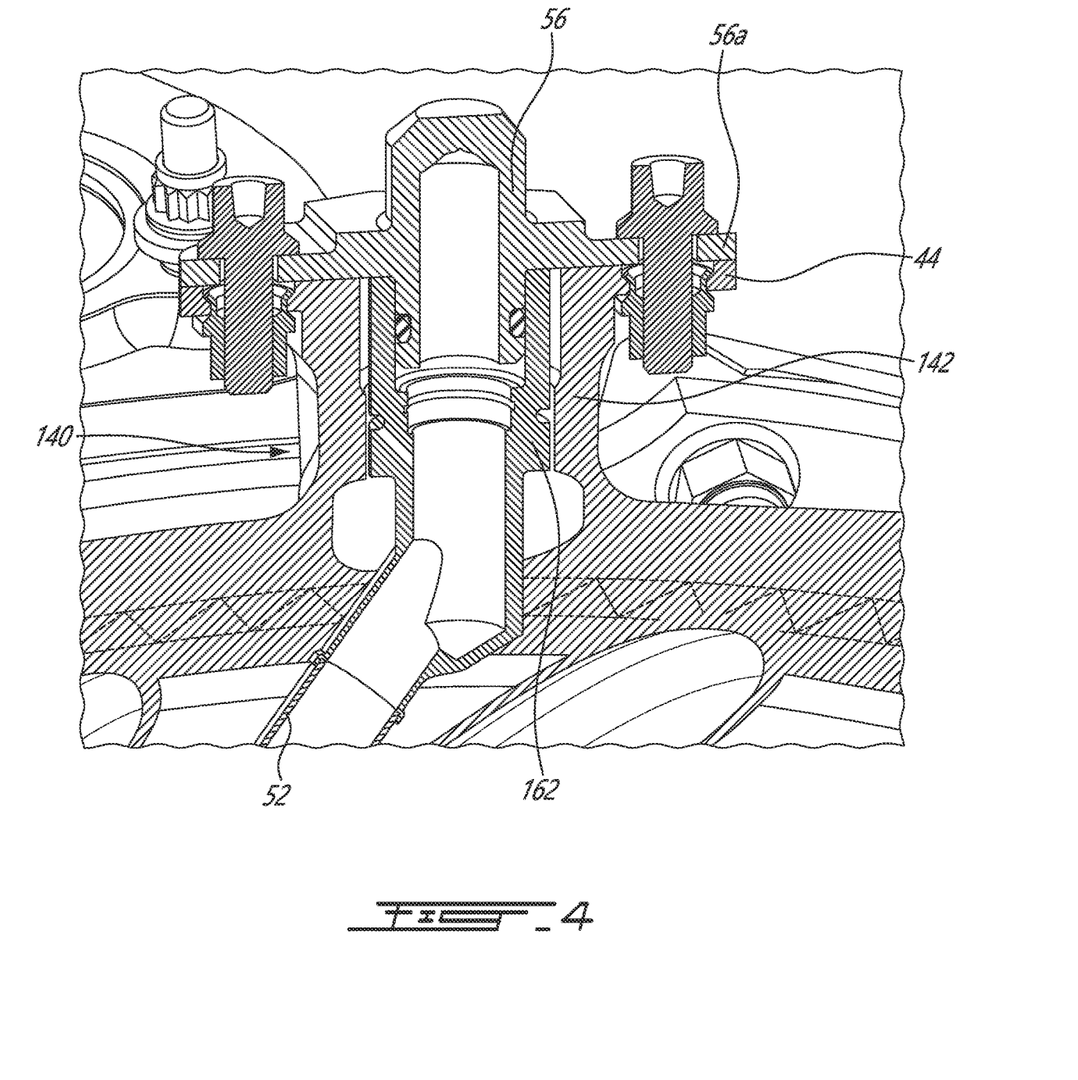
FIG. 4 is a three dimensional cutaway view of a boss in accordance with another embodiment for the case of FIG. 2.
Figure 5:
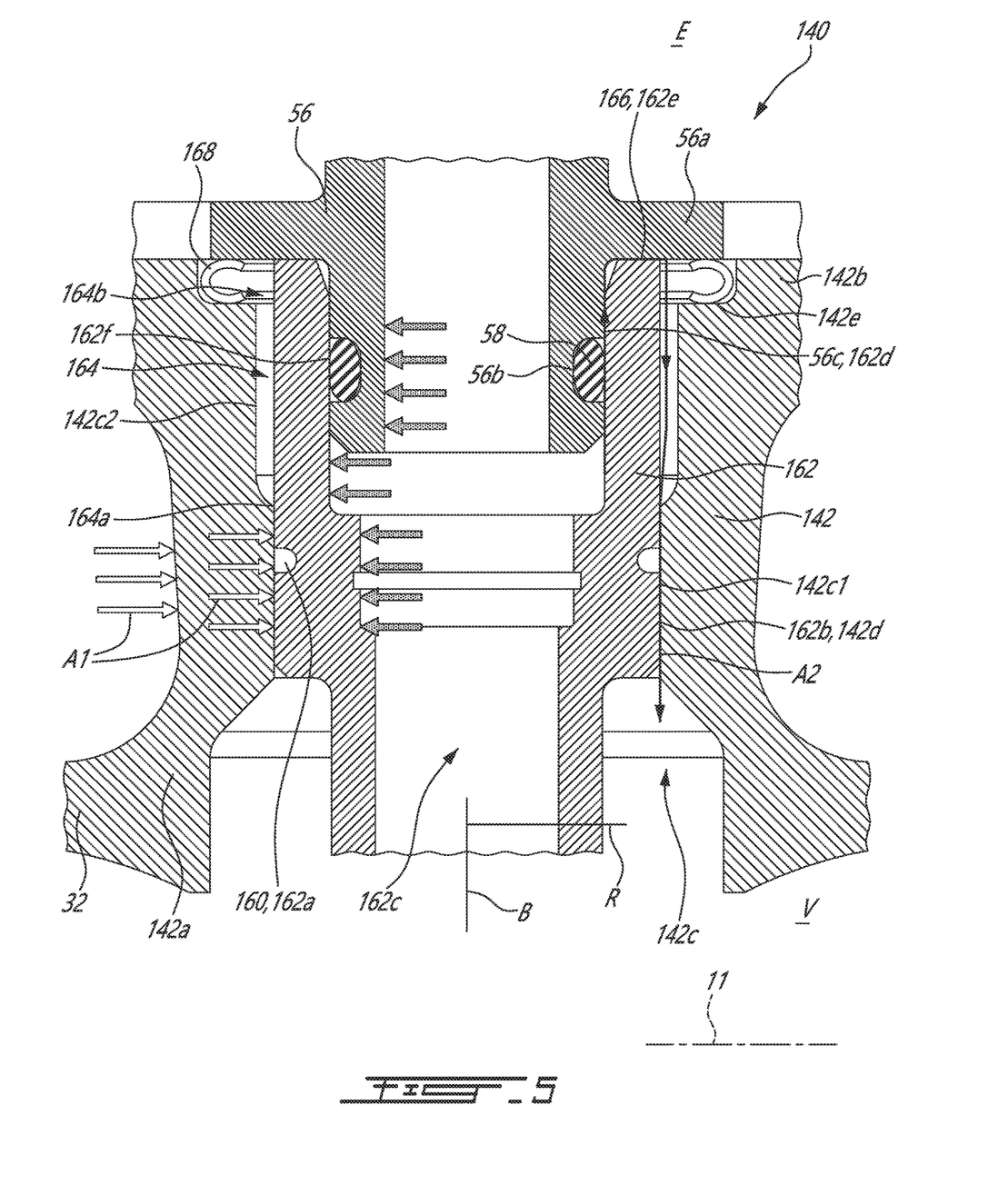
FIG. 5 is a cutaway view of the boss of FIG. 4.

Referring now to FIGS. 4-5, another embodiment of a boss is shown at 140. The boss 140 includes a body 142 extending from a first end 142a to a second end 142b along a boss axis B. The boss 140 defines an internal passage 142c located within the body 142 and extending from the first end 142a to the second end 142b. The first end 142a is secured to the gas generator case 32.

A tubular member 162 is received within the internal passage 142c of the body 142 of the boss 140. In the present embodiment, the tubular member 162 is secured to the boss 140 via a braze joint 160 between the tubular member 162 and the boss 140. The braze joint 160 extends all around the boss axis B and around the tubular member 162. More specifically, the braze joint 160 is located within the internal passage 142c between the first and second ends 142a, 142b of the body 142 of the boss 142. The tubular member 162 defines an annular groove 162a extending from an outer surface 162b of the tubular member 162 toward the boss axis B. The groove 162a is sized to receive a brazing material to create the braze joint 160 between the tubular member 162 and an inner surface 142d of the body 142 of the boss 140. The tubular member 162 defines a conduit 162c for feeding the lubricant to the bearing 36 via the tube 52.

Referring to FIG. 5, an annular gap 164 is defined between the tubular member 162 and the boss 140. The annular gap 164 extends all around the boss axis B. In the present case the annular gap 164 extends around a full circumference of the tubular member 162. The annular gap 164 is defined radially relative to the boss axis B between the inner surface 142d of the body 142 of the boss 140 and the outer surface 162b of the tubular member 162. The annular gap 164 extends axially from a first end 164a located where the tubular member 162 contacts the body 142 of the boss 140 to a second end 164b proximate the second end 142b of the body 142 of the boss 140. The second end 164b of the annular gap 164 is opened to the environment E outside the volume V defined by the gas generator case 32 before the fitting 56 is fastened to the annular flange 44 of the boss 140. The annular gap 164 therefore contains ambient air and is substantially sealed from the environment E by the fitting 56.

As illustrated in FIG. 5, the internal passage 142c of the body 142 of the boss 140 has a first section 142c1 and a second section 142c2 disposed radially outwardly of the first section 142c1 relative to the central axis 11 of the engine 10. A cross-sectional area of the second section 142c2 is greater than a cross-sectional area of the first section 142c1 to define the annular gap 164. In the present case, the difference in cross-sectional areas is obtained by having a diameter of the second section 142c2 greater than that of the first section 142c1. As illustrated, the boss 140 is secured to the tubular member 162 at the first section 142c1 of the internal passage 142c of the body 142 of the boss 140. In other words, the annular gap 164 is defined between a portion of the internal passage 142c of the body 142 of the boss 140 that has a diameter greater than that of a portion of the tubular member 162 that is received within the internal passage 142c.

As illustrated in FIG. 5, a portion of the fitting 56 is received within the conduit 162c of the tubular member 162. The portion of the fitting 56 is axially aligned with the annular gap 164 relative to the boss axis B. The portion of the fitting 56 is encircled by both of the annular gap 164 and the tubular member 162. The fitting 56 is sealingly engaged to the tubular member 162. More specifically, a sealing engagement is provided between an outer surface 56c of the portion of the fitting 56 and an inner surface 162*d* of the tubular member 162. In the embodiment shown, the sealing member 58 provides the sealing engagement between the surfaces 162*d*, 56*c* of the tubular member 162 and the fitting 56. More specifically, the inner surface 162*d* of the tubular member 162 defines a seat 162*f* against which the sealing member 58 is biased. The sealing member 58 is in the present embodiment received within the annular groove 56*b* that extends radially relative to the boss axis B from the outer surface 56*c* of the portion of the fitting 56 toward the boss axis B.

In the embodiment shown, the annular gap 164 and the sealing member 58 are aligned with one another. The sealing member 58 is disposed radially inwardly of the annular gap 164 relative to the boss axis B, and within the conduit 162*c* of the tubular member 162. The sealing member 58 is axially aligned with the annular gap 164 relative to the boss axis B. In the embodiment shown, the annular gap 164 and the first end 142*a* of the body 142 of the boss 142 that is secured to the gas generator case 32 are disposed on respective opposite sides of the braze joint 160 joining the tubular member 162 to the body 142 of the boss 140. This allows to maximize a distance between the gas generator case 32, which is hot, and the sealing member 58.

By extending around and encircling the sealing member 58, the annular gap 164 may shield the sealing member 58 from the high temperature of the gas generator case 32. In other words, the annular gap 164 containing air increases a thermal resistance in a radial direction relative to the boss axis B. In the embodiment shown, the sealing member 58, and the seat 162*f* against which the sealing member 58 is biased, are spaced apart from the body 142 of the boss 140 in the radial direction R relative to the boss axis B by the tubular member 162 and by the annular gap 164. The annular gap 164 may make it more difficult for the heat to diffuse radially inwardly along arrows A1 from the inner surface 142*d* of the body 142 of the boss 140 to the outer surface 162*b* of the tubular member 162, and from the outer surface 162*b* of the tubular member 162 to the seat 162*f* and the sealing member 58. This may be explained by the lower thermal conductivity of the air contained in the annular gap 164 compared to that of the tubular member 162 and of the boss 140. In the embodiment shown, the annular gap 164 contains an insulating material, which is air in the present case. It will be appreciated that any other suitable insulating material may be used without departing from the scope of the present disclosure. A thermal conductivity of the insulating material contained in the annular gap 164 is less than that of the tubular member 162 and of the boss 140.

As discussed before with reference to FIG. 3, the only seal that seals the lubricant flowing within the tube 52 from the volume V defined by the gas generator case 32 is the weld or braze joint 60 between the tube 52 and the boss 40.

Referring back to FIG. 5, the assembly of the boss 140, the tubular member 162, and the fitting 56 defines a triple seal configuration. In other words, the conduit 162*c* of the tubular member 162 is sealed from the internal passage 142*c* of the body 142 of the boss 140 by three seals that are serially disposed one after the other between the conduit 162*c* and the internal passage 142*c*.

In the illustrated embodiment, the triple seal includes: the sealing member 58 that provides the sealing engagement between the fitting 56 and the tubular member 162 as previously discussed; a sealing contact 166 defined between an end 162*e* of the tubular member 162 and the annular flange 56*a* of the fitting 56, the end 162*e* of the tubular member 162 is located proximate the second end 142*b* of the body 142 of the boss 140; and the braze joint 162 that is located within the internal passage 142*c* and between the tubular member 162 and the body 142 of the boss 140. In the embodiment shown, the sealing contact 166 is defined between an annular surface of the end 162*e* of the tubular member 162 and a surface of the annular flange 56*a* of the fitting 56. For leaking out of the tubular member 162, the lubricant would have to flow along arrow A2. This means that the lubricant would have to pass through each of the three seals, that are, the sealing member 58, the sealing contact 166, and the braze joint 160, to reach the volume V defined by the gas generator case 32. Such a sealing arrangement may offer redundancy and may limit lubricant from leaking out of the tubular member 162.

In the embodiment shown, the annular gap 164 extends axially relative to the boss axis B between the sealing contact 166 and the braze joint 160. The sealing member 58 is located radially between the braze joint 160 and the sealing contact 166 relative to the central axis 11 of the engine 10. Such a configuration may further help in preventing the lubricant from flowing out of the tubular member 162 into the volume V since the lubricant would have to flow radially outwardly and, then, would have to flow radially inwardly relative to the central axis 11. This may mean that the lubricant would have to overcome gravity to flow past the sealing member 58 if the boss 140 were located on an upper portion of the gas generator case 32 or to overcome gravity to flow past the braze joint 160 if the boss 140 were located on a lower portion of the gas generator case 32. This may further help in limiting the lubricant from flowing from the conduit 142*c* of the tubular member 142 to the volume V and internal passage 142*c* of the body 142 of the boss 140.

In the illustrated embodiment, a second sealing member 168 is disposed between the boss 140 and the annular flange 56*a* of the fitting 56. The second sealing member 168 thereby creates a sealing engagement between the fitting 56 and the boss 140. The second sealing member 168 is a C-ring annular seal extending all around the boss axis B. The second sealing member 168 is disposed radially outwardly of the sealing contact 166 and of the tubular member 162 relative to the boss axis B. The second sealing member 168 is biased radially relative to the central axis 11 between the flange 56*a* of the fitting 56 and a shoulder 142*e* defined by the inner surface 142*d* of the body 142 of the boss 140. The shoulder 142*e* is oriented toward the flange 56*a*.

Referring now to FIG. 6, the lubricant flows from the tubular member 162 (FIG. 5) radially inwardly within the tube 52 along arrow A3 and reaches a bearing housing 170. The lubricant may then be injected into a bearing cavity 172 defined by the bearing housing 170. In the embodiment shown, the lubricant flows from the tube 52 to a second fitting 174. The second fitting 174 hydraulically connects an outlet end 52*a* of the tube 52 to a lubricant receiver 176 secured within the bearing housing 170 and located within the bearing cavity 172. The lubricant receiver 176 is used to distribute the lubricant circumferentially around the central axis 11 of the engine 10 and within the bearing cavity 172.

A sealing member 178 creates a sealing engagement between the second fitting 174 and the lubricant receiver 176 of the bearing housing 170. The sealing member 178 is received within a groove 174*a* of the second fitting 174. The second fitting 174 has an outlet end received within the lubricant receiver 176. The lubricant may then be distributed circumferentially by the lubricant receiver 176.

Since the bearing housing 170 is disposed radially inwardly of the combustor 16 (FIG. 1) of the engine 10 relative to the central axis 11, the bearing housing 170, like the gas generator case 32, may become hot because of the diffusion of the heat of the hot combustion gases. The combustion gases transfer their heat to an inner case 182 of the engine 10. The heat is then transferred by conduction from the inner case 182 to the bearing housing 170. It may therefore be advantageous to shield the sealing member 178 from the heat of the bearing housing 170.

In the embodiment shown, a gap 180 is disposed between the lubricant receiver 176 and the bearing housing 170. The gap 180 is aligned with and at least partially encircles the sealing member 178 to shield the sealing member from heat from the inner case 182 and from the bearing housing 170. The gap 180 may extend annularly all around the sealing member 178.

It will be appreciated that the disclosed boss 140 may be used to any other cases of the gas turbine engine 10. For instance, the boss 140 may be used for the turbine case 34. Moreover, any gas turbine engine may use the disclosed boss 140. For instance, the boss 140 may be used by a turbofan engine, a turboprop engine as shown in FIG. 1, and a turboshaft engine. The principles of the present disclosure may be used for any fluid lines such as scavenge lines, fuel lines, air tubes, etc.

The disclosed boss 140 may improves the durability of the sealing member 58 by introducing the annular gap 164 which may act as a sealing member thermal insulation. This may eliminate direct contact between the hot gas generator case 32 and the sealing member 58, and may thus reduce the thermal gradient between the sealing member 58 and mating parts. The disclosed boss 140 introduces a compact arrangement that may not require special machining, new complex features or MFA data about functionality of the interface. The disclosed triple seal configuration may reduce probability of internal fluid leakage and may offer cost and weight savings.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine, comprising:
a case extending circumferentially around a central axis of the gas turbine engine;
a boss protruding from the case away from the central axis, the boss defining an internal passage;
a tubular member received within the internal passage of the boss and secured to the boss, the tubular member defining a conduit for receiving a fluid from a fluid source;
an annular gap extending all around the tubular member and located between the tubular member and the boss; and
a fitting hydraulically connecting the fluid source to the conduit of the tubular member, the fitting having a portion received within the tubular member and encircled by both of the annular gap and the tubular member, the fitting sealingly engaged to the tubular member.

2. The gas turbine engine of claim 1, wherein the fitting is sealingly engaged to the tubular member via a sealing member, the sealing member being encircled by the tubular member and by the annular gap, the annular gap containing an insulating material having a thermal conductivity less than that of the tubular member.

3. The gas turbine engine of claim 2, wherein the tubular member is secured to the boss via a braze joint between the tubular member and the boss.

4. The gas turbine engine of claim 3, wherein the sealing member and the case are disposed on respective opposite sides of the braze joint.

5. The gas turbine engine of claim 1, wherein the internal passage has a first section and a second section, a cross-sectional area of the second section greater than that of the first section and greater than a diameter of the tubular member to define the annular gap.

6. The gas turbine engine of claim 1, wherein the conduit of the tubular member is sealed from the internal passage of the boss with three seals serially disposed between the conduit of the tubular member and the internal passage.

7. The gas turbine engine of claim 6, wherein the three seals include a sealing member providing a sealing engagement between the fitting and the tubular member,
a sealing contact between an end of the tubular member and an annular flange of the fitting, the annular flange secured to a flange of the boss, and
a braze joint within the internal passage and between the tubular member and the boss, the braze joint extending all around the tubular member.

8. The gas turbine engine of claim 7, wherein the annular gap extends between the sealing contact and the braze joint, the sealing member located radially between the braze joint and the sealing contact relative to the central axis.

9. The gas turbine engine of claim 7, comprising a second sealing member between the boss and the annular flange of the fitting, the second sealing member creating a sealing engagement between the boss and the annular flange of the fitting.

10. The gas turbine engine of claim 9, wherein the second sealing member is a C-ring seal surrounding the end of the tubular member.

11. A boss assembly for a case of a gas turbine engine, comprising:
a boss having a body securable to the case and extending along a boss axis from a first end securable to the case to a second end, the body defining an internal passage between the first end and the second end;
a tubular member received within the internal passage of the body and secured to the body, the tubular member having an inner surface defining a conduit for flowing a fluid;
a portion of the internal passage having a diameter greater than a portion of the tubular member received within the internal passage to define an annular gap between the tubular member and the body, the annular gap extending all around the boss axis; and
a fitting hydraulically connectable to a fluid line, the fitting received within the portion of the tubular member, the fitting sealingly engaged to the inner surface of the tubular member, the fitting connecting the conduit of the tubular member in fluid communication with the fluid line.

12. The boss assembly of claim 11, wherein the fitting is sealingly engaged to the tubular member via a sealing member, the sealing member disposed radially inwardly of the annular gap relative to the boss axis between the portion of tubular member and the fitting, the sealing member axially aligned with the annular gap relative to the boss axis, the annular gap containing an insulating material having a thermal conductivity less than that of the tubular member.

13. The boss assembly of claim 12, wherein the tubular member is secured to the boss via a braze joint between the tubular member and the boss and between the first end and the second end of the boss.

14. The boss assembly of claim 13, wherein the sealing member and the first end of the boss are disposed on respective opposite sides of the braze joint.

15. The boss assembly of claim 14, wherein the conduit of the tubular member is sealed from the internal passage of the boss with
the sealing member between the fitting and the tubular member,
a sealing contact between an end of the tubular member and an annular flange of the fitting, the annular flange secured to the boss, and
the braze joint within the internal passage and between the tubular member and the boss, the braze joint extending all around the tubular member.

16. The boss assembly of claim 15, wherein the annular gap extends axially relative to the boss axis between the sealing contact and the braze joint, the sealing member located axially between the braze joint and the sealing contact relative to the boss axis.

17. The boss assembly of claim 16, comprising a second sealing member between the boss and the annular flange of the fitting, the second sealing member creating a sealing engagement between the boss and the annular flange of the fitting.

18. The boss assembly of claim 17, wherein the second sealing member is a C-ring seal surrounding the end of the tubular member.

19. A boss assembly for a case of a gas turbine engine, comprising:
a boss having a body and extending along a boss axis from a first end securable to the case to a second end, the body defining an internal passage between the first end and the second end;
a tubular member received within the internal passage of the body and secured to the body, the tubular member having an inner surface defining a conduit for flowing a fluid, and
a fitting having a portion received within the tubular member,
the conduit sealed from the internal passage of the boss with three seals serially disposed between the conduit of the member and the internal passage, the three seals including
a sealing member providing a sealing engagement between the fitting and the tubular member,
a sealing contact beween an end of the tubular member and an annular flange of the fitting, the annular flange secured to a flange of the boss, and
a braze joint within the internal passage and between the tubular member and the boss, the braze joint extending all around the tubular member.

20. The boss assembly of claim 19, comprising an annular gap extending all around the tubular member and located radially between the tubular member and the boss relative to the boss axis, the sealing member being encircled by the tubular member and by the annular gap.

* * * * *